United States Patent
Nippes

(10) Patent No.: US 10,550,961 B2
(45) Date of Patent: Feb. 4, 2020

(54) LEAD SERVICE WATER PIPE LINE REMOVAL APPARATUS AND METHOD

(71) Applicant: Joseph Timothy Nippes, Lancaster, PA (US)

(72) Inventor: Joseph Timothy Nippes, Lancaster, PA (US)

(*) Notice: Subject to any disclaimer, the term of this patent is extended or adjusted under 35 U.S.C. 154(b) by 0 days.

(21) Appl. No.: 16/121,073

(22) Filed: Sep. 4, 2018

(65) Prior Publication Data

US 2019/0049041 A1   Feb. 14, 2019

Related U.S. Application Data

(63) Continuation-in-part of application No. 15/675,346, filed on Aug. 11, 2017, now abandoned.

(51) Int. Cl.
*F16L 1/028* (2006.01)

(52) U.S. Cl.
CPC ................... *F16L 1/028* (2013.01)

(58) Field of Classification Search
CPC .................. F16L 55/18; B66F 19/00
USPC .......................... 254/4 R, 4 B, 134
See application file for complete search history.

(56) References Cited

U.S. PATENT DOCUMENTS

| | | | |
|---|---|---|---|
| 2,560,499 A * | 7/1951 | Warry ................. | B66B 9/16 187/243 |
| 4,006,521 A | 2/1977 | Pedone | |
| 4,626,134 A | 12/1986 | Coumont | |
| 4,637,756 A | 1/1987 | Boles | |
| 5,013,188 A | 5/1991 | Campbell et al. | |
| 5,211,509 A | 5/1993 | Roessler | |
| 5,328,297 A * | 7/1994 | Handford ............. | E02F 5/10 405/184 |
| 5,653,554 A | 8/1997 | Preston et al. | |
| 5,984,582 A | 11/1999 | Schwert | |
| 6,149,349 A | 11/2000 | Nikiforuk et al. | |
| 6,585,453 B2 | 7/2003 | Robinson | |
| 7,128,499 B2 | 10/2006 | Wentworth | |
| 7,985,037 B2 | 7/2011 | Duggan | |
| 8,083,213 B2 | 12/2011 | Tjader | |
| 8,277,147 B2 | 10/2012 | Cilliers | |

(Continued)

FOREIGN PATENT DOCUMENTS

| | | |
|---|---|---|
| CA | 2057605 | 11/1995 |
| WO | 2005098195 A | 10/2005 |

*Primary Examiner* — Sean D Andrish
(74) *Attorney, Agent, or Firm* — Patent Law Associates

(57) ABSTRACT

An apparatus and a method of extracting buried lead water supply pipe with minimal excavation and which allows removal and containment of the lead pipe. The extraction apparatus includes a frame having an upwardly extending mast, a guide pulley mounted on the frame, and a pulling apparatus mounted on the mast. A take-up spool is mounted on the mast between the guide pulley and pulling apparatus and positioned to force a pipe pulling cable into a non-linear path between the guide pulley and the pulling apparatus. Extracted pipe is pulled into the non-linear path until the pipe is fully extracted from the ground. Multiple spiral loops around the take-up spool by the pulling cable may be necessary to fully contain the extracted pipe. Following extraction, the pipe may be unspooled from the take-up spool, the pulling cable removed for re-use, and the pipe may then be sent for disposal.

4 Claims, 10 Drawing Sheets

(56) References Cited

U.S. PATENT DOCUMENTS 8,596,915 B2 12/2013 Indreland
2015/0083984 A1 3/2015 Tjader

* cited by examiner

LEAD SERVICE WATER PIPE LINE REMOVAL APPARATUS AND METHOD

CROSS REFERENCE TO RELATED APPLICATIONS

This application is a Continuation in Part application of U.S. application Ser. No. 15/675,346, filed Aug. 11, 2017.

BACKGROUND OF THE INVENTION

The present invention generally relates to the field of pipeline replacement and, more particularly, to an apparatus and method for replacing buried drinking water supply lines made of lead piping which minimizes ground disruption and potential dispersion of the lead during pipe removal.

It is estimated that there are over 6 million installations of lead pipes carrying drinking water from water supply mains to residences in the United States. Due to the harmful effects of lead ingestion by humans and other animals, replacement of this piping is becoming increasingly imperative. In urban areas where space is tight and buried infrastructure is very dense, excavating buried pipelines for replacement is particularly expensive and not always practical or feasible.

Branch water service supply lines are generally less than 2 inches in diameter, with the majority being 1-inch or less. It is common to remove these pipes by accessing and freeing the ends of the pipe, attaching a pulling apparatus to one end, and then pulling the pipe through the ground in which it is buried. Sawing, grinding, and/or fracturing the pipe is not permissible as such operations have the potential to disperse lead particles into the environment. In some instances, replacement pipe will be secured to the end opposite of that being pulled so that the replacement pipe is pulled into position as the old pipe is being removed. Should the pipe being removed break during the pulling process, excavation of the pipe is required which eliminates any advantage of the pull-through replacement method. The risk of breakage when pulling from the leading end or wadding when pulling from the trailing end is greater with lead pipes which are quite malleable and have relatively low tensile strength.

An alternative method involves feeding a cable through the pipe to be removed, securing the cable to the pipe, and then pulling the cable and pipe through the ground. While this approach overcomes limitations in the strength of lead pipe, it does not allow for the lead pipe to be easily separated from the cable during the pulling operation. The result is generally that the pulling cable becomes sacrificial, increasing the costs associated with the replacement operation. One such method is disclosed in U.S. Pat. No. 8,277,147 issued to Cilliers which discloses such a method in which the cable is affixed within the pipe by introduction of a settable fluid which secures the cable to the entire wetted length of the pipe interior.

It would be advantageous to provide a method of replacing buried lead water supply pipe that overcomes these limitations.

SUMMARY OF THE INVENTION

The present invention includes an apparatus and a method of replacing buried lead water supply pipe with minimal excavation and which allows removable and containment of the lead pipe. The apparatus includes a leading collet and a lagging collet which are secured to opposite free ends of the lead pipe to be removed. A cable is directed through the pipe to be removed and connected to each of the collets. The cable length should closely match the length of the pipe in which it is directed. The pulling cable preferably extends from leading collet and is connected to a winch or similar pulling apparatus. A connector may be provided on the leading collet to permit attachment of a second cable, such as the cable provided on a winch. The cable between the lead collet and the winch may be directed along a path which permits easy access to the removed lead pipe following extraction from the ground. New pipeline may be connected to the lagging collet so that the replacement pipeline is pulled into the void left by the replaced pipe as it is extracted.

A pipeline removal apparatus is provided to connect a winch apparatus to the pipeline pulling cable in a manner that enables the entire length of pipe to be removed from the ground and subsequently removed from the winch apparatus without the need to cut the pipe, eliminating the potential for creating airborne lead particles by having to cut pipe from the removal apparatus as it is removed. To accomplish this objective, a frame with a reaction foot is positioned in the excavated access adjacent to the pipeline, the frame having an adjustable height mast extending therefrom with a guide pulley at a distal end. The pulling cable is directed from a guide pulley adjacent to the reaction foot, around a second guide pulley positioned at the distal end of the mast before connecting to the winch. The length of the cable path around the guide pulleys is at least as much as the length of the pipeline to be removed to avoid entrainment of the extracted pipe in the winch apparatus. Further, the design of the removal apparatus is adjustable to accommodate removal of a range of pipe lengths while providing an apparatus that permits removal of the pulling cable once the pipeline has been extracted from the ground.

An alternative embodiment minimizes overhead clearance required for operation. In lieu of an adjustable mast, the alternative embodiment includes a take-up spool connected to the mast between a lower guide pulley and a pulling apparatus. The take-up spool is positioned so that the cable path between the guide pulley and the pulling apparatus is non-linear. Further, the pulling cable may encircle the take-up spool multiple times so that the pipe line is coiled on the spool as it is extracted from the ground. Once the pipe line is completely removed from the ground it may be unwound from the take-up spool, the pulling cable removed, and the pipe sent for disposal.

The method of replacing the pipe comprises the steps of:

Accessing the ends of the pipe that is to be replaced. This typically involves excavating the area adjacent to the user valve isolation box and the area where the water supply line enters the building. It is often possible to enlarge a wall penetration surrounding the water supply line to permit the supply line to freely pass therethrough. There may also be a portion of supply pipe extending between the user valve isolation box (typically located at the edge of the right of way surrounding the water main) and the water main. This portion may also be removed using the method, but requires excavation of the water main at the supply line tap location.

Providing a pulling apparatus at the leading end of the pipe to be removed. Pulling is typically from the end adjacent to the valve isolation box which provides greater access than locations immediately adjacent to or even within the building supplied by the water supply line.

Configuring the pulling apparatus so that a cable connecting a winch to the pipeline is directed along a path that exceeds the length of the pipe to be removed. To this end, the pulling apparatus comprises a frame with a reaction foot that is positioned in an excavation pit adjacent to the pipe, an adjustable mast, and a plurality of guide pulleys to manage the path of the cable. The cable pathway is adjusted so that its length is equal to or greater than the length of the pipeline to be removed.

Directing a cable through the pipe to be removed. The cable may be integral to cable provided on the pulling apparatus or a separate cable with provisions for connecting to the pulling apparatus.

Attaching a leading collet and a lagging collet to respective ends of the pipe to be removed. The collets are configured to fixedly grasp both the cable and the pipe to be removed.

Applying a pulling tension to the cable in the leading direction. The tension is applied to the pipe to be removed at both the leading and lagging collets which prevents the entire pulling tension from being applied to the relatively weaker lead pipe. Continuing to pull the pipeline until it is extracted from the ground and positioned on the pulling apparatus but not enrolled in the winch.

Releasing the collets and extracting the cable from within the pipe that was removed. The lead pipe can then be disposed while the pulling apparatus, cable, and collets may be reused.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "up" or "down," or "over" or "under," or "above" or "below" are used as a matter of mere convenience, and are determined from the perspective of the ground surface. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 6:
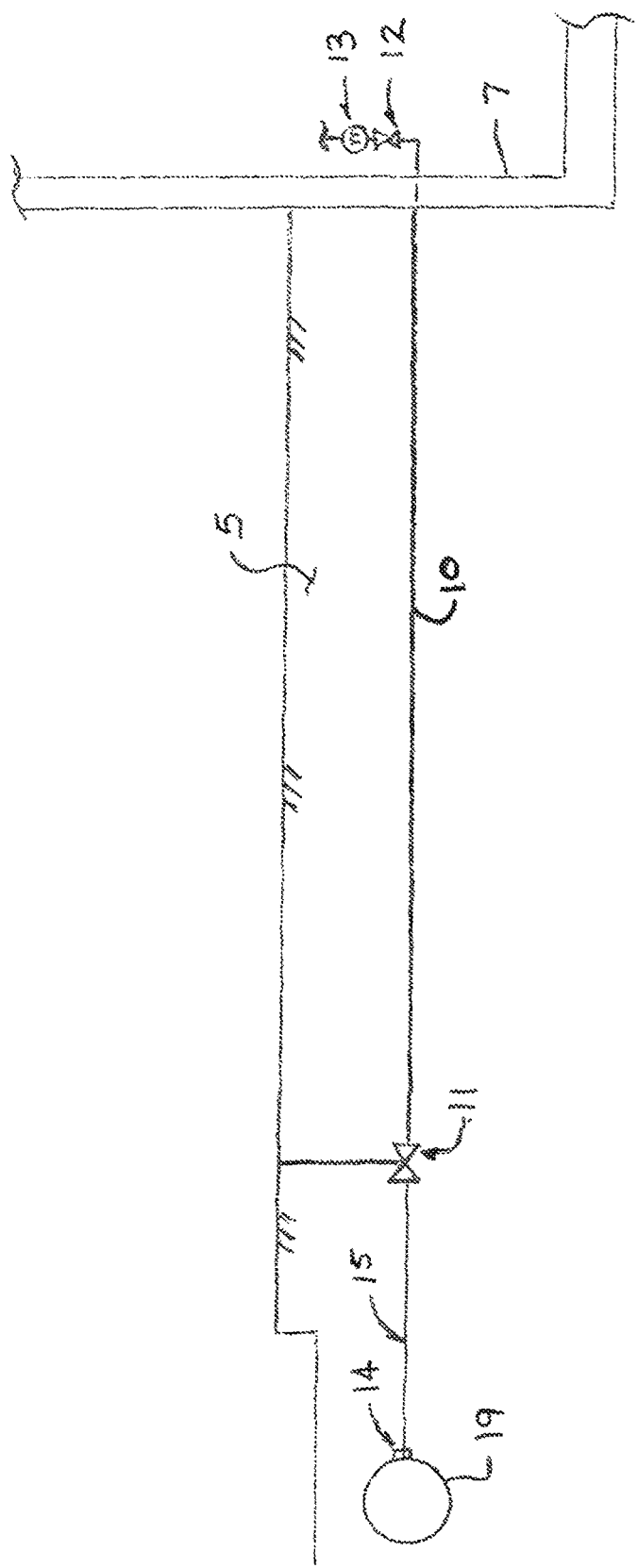
FIG. 6 provides side view of a typical water service supply pipeline of the type on which the present invention is useful.

Referring to FIG. 6, there is shown a diagrammatic elevation view of a typical arrangement of a buried water service supply line for a building, typically a residence. A water main 19 is typically buried under a street or other right-of-way to provide water to buildings situated therealong. Taps 14 into the water main 19 allow connection of service supply lines comprising an extension line 15 and a service supply line 10. A service isolation valve 11 is typically provided proximate to the edge of the right-of-way. The service supply line 10 extends through the ground 5 and typically penetrates a building 7, generally a below-grade wall and features an isolation valve 12, meter 13, or other flow managing devices before being distributed to the building interior.

Figure 1:
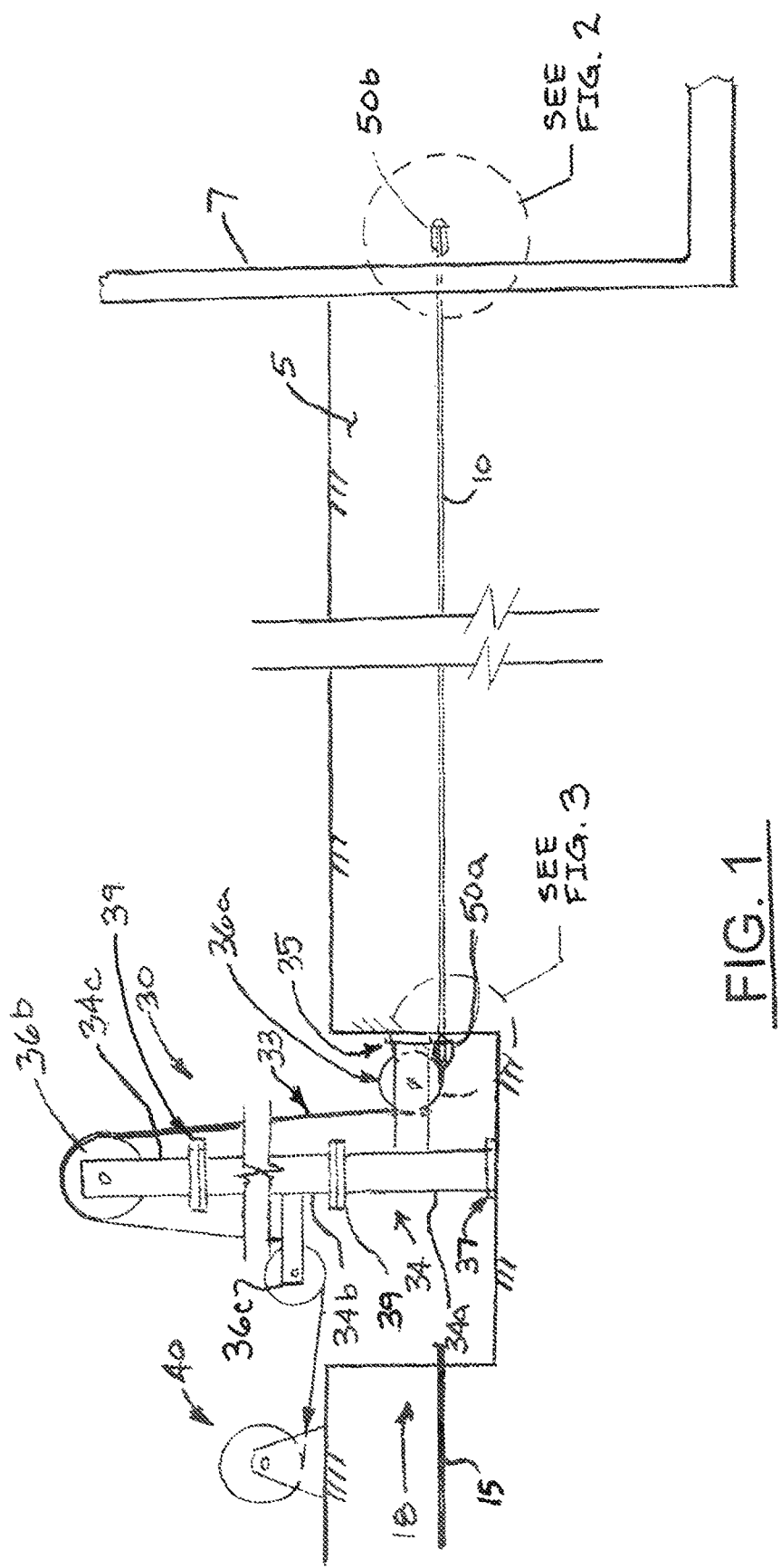
FIG. 1 presents a side view of a typical pipeline replacement arrangement utilizing the method of the present invention.

For service supply lines comprising lead pipe material, replacement may be accomplished with the instant invention. Referring to FIGS. 1 and 6, the service supply line is accessed, preferably by excavating an pipe line extraction access pit 18 around the service isolation valve 11. Once excavated, the valve is removed by shearing the pipe immediately upstream and downstream. An extraction apparatus 30 is positioned in the access pit 18 and the service supply line is disconnected at the building end, typically by shearing the pipe and removing any penetration sealant where the supply line 10 enters the building 7 leaving both ends of the service supply line 10 open.

A first cable 32 is directed through the service supply line 10, the cable having sufficient strength for removing the pipe and having a diameter small enough to fit within the interior diameter of the service supply line 10. Connecting collets 50 are positioned at each end of the service supply line, one being the leading collet 50a and the other being the lagging collet 50b, determined by the direction in which the supply line 10 is to be pulled. The connecting collets are configured to simultaneously grip the supply line 10 and the first cable 32 to create an integral structure having sufficient tensile strength to withstand the pulling forces.

Figure 2:
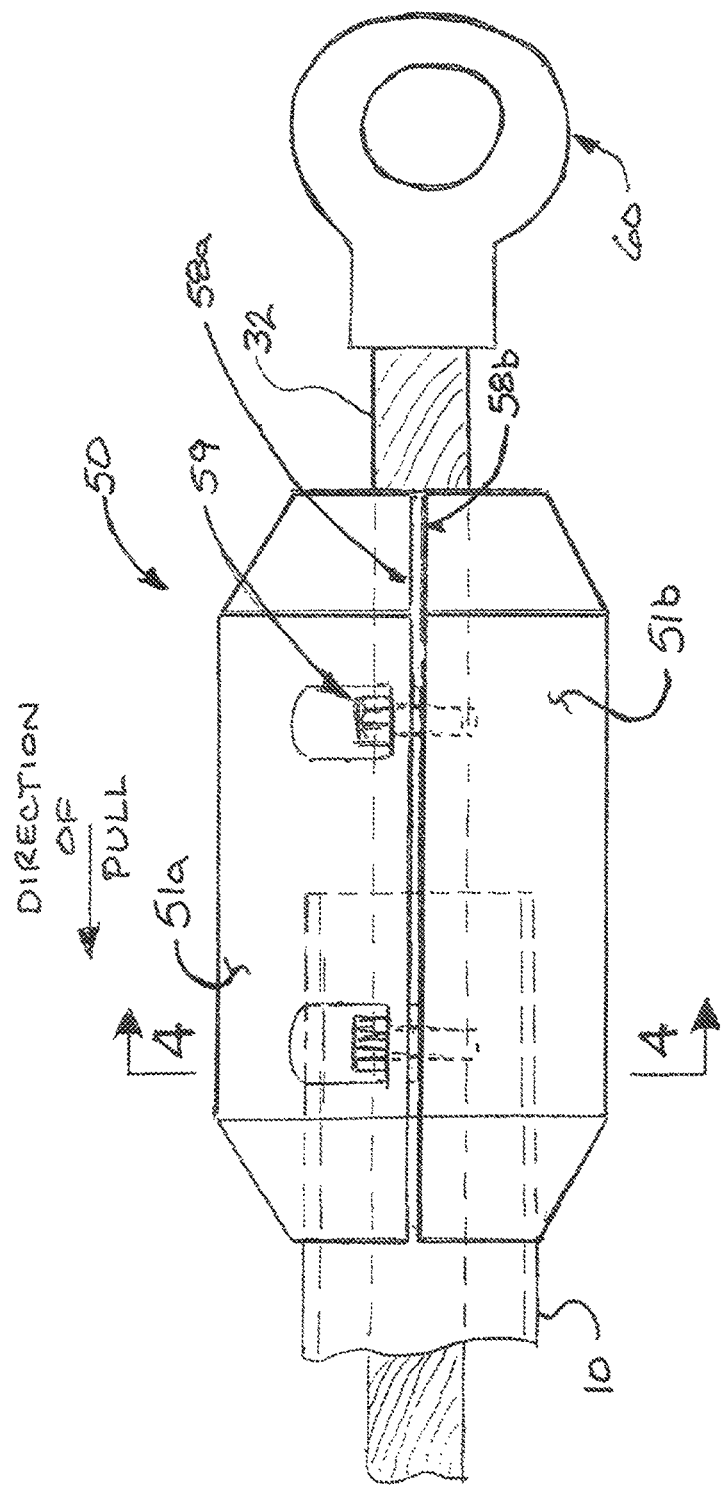
FIG. 2 illustrates one embodiment of a cable connection collet of the present invention shown in a lagging or trailing position.
Figure 3:
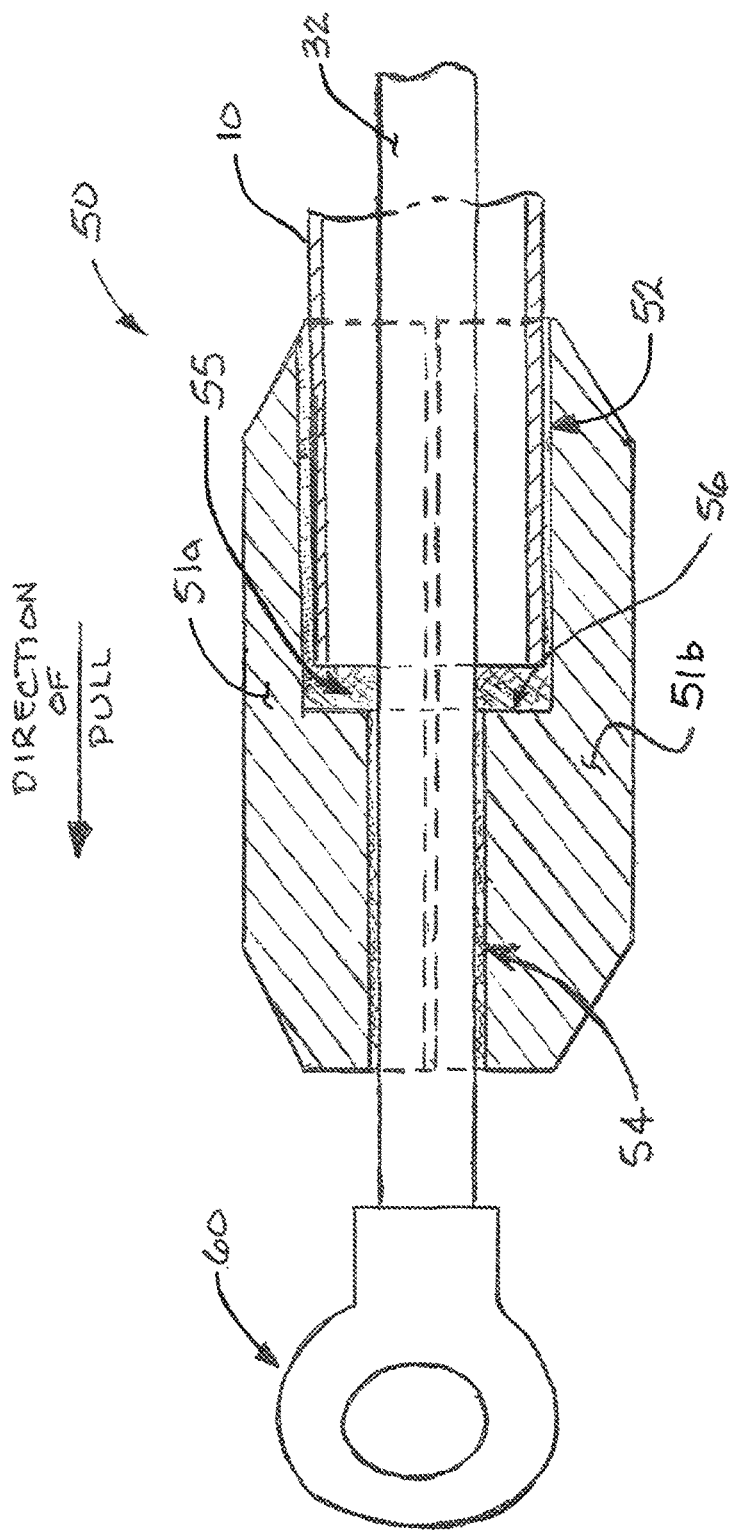
FIG. 3 is a cross-section illustration of the cable connection collet of FIG. 2 shown in a leading position.
Figure 4:
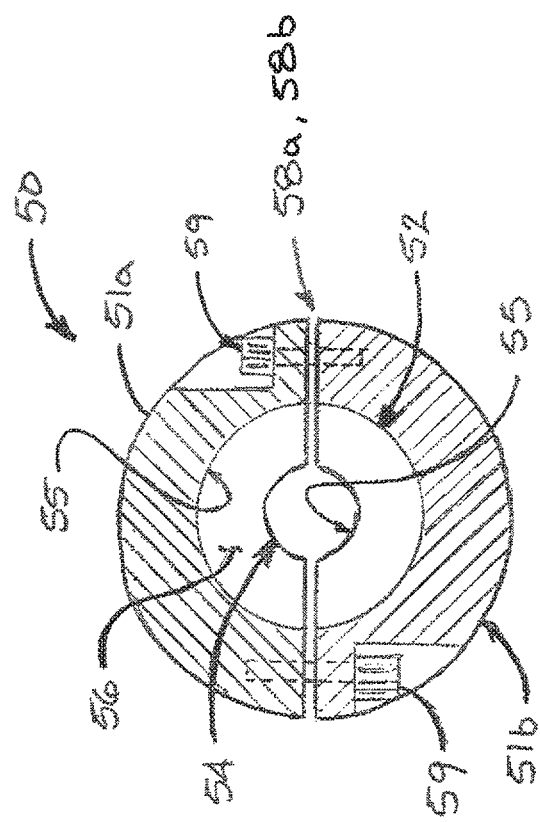
FIG. 4 is a section view of the of the cable connection collet of FIG. 2 taken along cut line 4-4.
Figure 5:
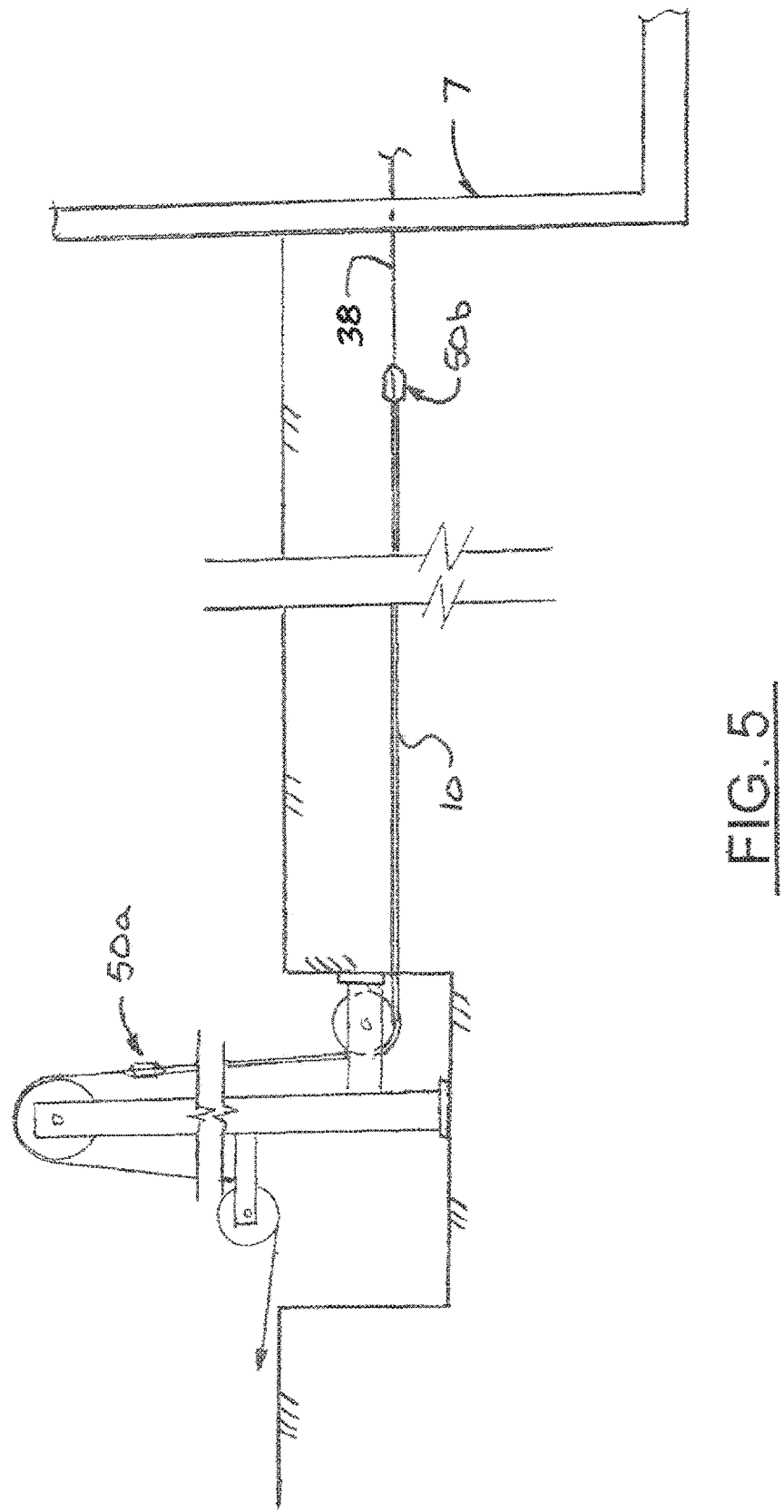
FIG. 5 shows a second view of FIG. 1 wherein the pipeline is partially displaced during removal.

An exemplar connecting collet is illustrated in FIGS. 2 and 3, comprising a clamshell or two-part generally cylindrical structure having first and second portions 51a, 51b that may be clamped simultaneously around the cable 32 and supply line 10. A first bore 52 is sized to surround the outside diameter of the service supply line 10. A second bore 54 is sized to surround the outside diameter of the first cable 32. The first and second bores 52, 54 abut at a transition 56 which is positioned to provide sufficient clamping area for the pipe line and the cable to preclude movement. The interior surface of the first and second bores 52, 52 is preferably provided with a gripping surface 55 having a high coefficient of friction with the outer surfaces of the pipe line 10 and first cable 32 so that, when clamped, the collets 50 resist movement in relation to the pipe line or cable. As illustrated, the first and second portions 51a, 51b meet at joining surfaces 58a, 58b and are clamped together by tensioning fasteners 59. A small space is preferably provided between the joining surfaces to assure that sufficient clamping force is applied prior to contact between the surfaces. A connector 60 is provided to permit the leading collet 50a to be connected to a second cable 33 which provides the extraction force for the pipe line 10. A similar connector 60 provided on the lagging collet 50b enables connection of a pull-through line 38 or even the replacement pipe line itself, the latter having the advantage of removing and replacing the water supply service line in a single pulling operation.

The collet configuration as illustrated allows for a single collet configuration to be used in the leading or lagging location simply by reversing the orientation of the collet. Alternatively, the collet configuration may be specific to the leading or lagging position. The configuration further includes tapered portions to ease passage of the lagging collet through the ground.

Other configurations of the collets 50 are envisioned that utilize various connections means to pipe line and/or cable. For example, barrel fixtures may be affixed to the cable portions by crimping or equivalent connection, the fixtures having a finite axial length with a diameter exceeding the cable diameter. The fixture outer diameter is sized to permit passage through the inside diameter of the pipe while the transition between cable and fixture provides a stepped shoulder for interface with a matching profile on the inside diameter of the collet normally configured to clamp the cable. The interface limits relative axial movement, whether uni- or bi-directionally, between the cable and collet as would clamping the collet to the cable. Such configurations enabling a fixed connection between pipe line and cable at leading and lagging locations are contemplated within the scope of the invention.

Now referring to FIGS. 1-5, the cable may be provided with one or more connectors 60 outboard of the pipe line 10 to permit connection of the pipe line 10/first cable 32 assembly to other assemblies. The leading collet 50a is necessarily connected by the second cable 33 to a pulling apparatus 40 such as a winch which provides the tensioning force for pipe line removal. The second cable 33 is directed through a pipeline extraction apparatus 30 having a mast 34 and a plurality of pulleys 36a, 36b, 36c or the like to guide the first and second cables 32, 33 along with the pipe line 10 surrounding the first cable 32. The pulleys include at least a first guide pulley 36a positioned adjacent to the location at which the buried pipeline is exposed in the access pit and a second guide pulley 36b positioned at the distal end of the mast 34. Additional pulleys 36c may be provided to guide the cables.

The mast extends generally orthogonally away from the axis of the pipe line 10, preferably upwardly out of the excavated access pit, and is of sufficient height as to provide a take-up length that enables the length of the pipe line 10 to be removed to be fully supported on the mast without the pipe line 10 being engaged in the pulling apparatus 40 (e.g., winch). This generally requires that the mast 34 be at least approximately half the height as the length of pipe line 10 being removed. In this configuration, the extracted pipe is deflected around the first and second guide pulleys. It may be preferable for the mast length to be at least that of the pipe to be removed so that the extracted pipe is only deflected around the only the first guide pulley 36a adjacent to the buried pipeline end which eases removal of the first cable 32 therefrom once the pipe is fully extracted from the ground.

Removal of buried pipe line by pulling methods is best accomplished in a single, continuous pull; interruptions of the pulling increase the chances of breaking the pipe line and increase wear and tear on the cables and cable tensioning apparatus.

The mast 34 may be provided with vertical adjustment means 39 to enable the height of the mast (take-up length) to be altered to suit the specific pipe line removal configuration of different removal locations. The vertical adjustment means may comprise mechanical connections which allow extension sections 34b to be added between the base portion 34a and the distal portion 34c to achieve the required take-up length. Extension sections 34b may be provided in various lengths to enable a single additional section 34b to be used, or extension sections 34b having a uniform length may be provided and the proper number of extension sections 34b incorporated to yield the desired mast height (take-up length). The mechanical connections are preferably uniform in configuration and may include a flanged connection using uniformly spaced bolted connections.

The mast 34 may also include articulated joints that enable the mast to be conveniently compacted for transport when not in use. Such articulated joints may also be used to adjust the mast height to achieve the desired offset of the second guide pulley to achieve the require cable take-up length.

Figure 7:
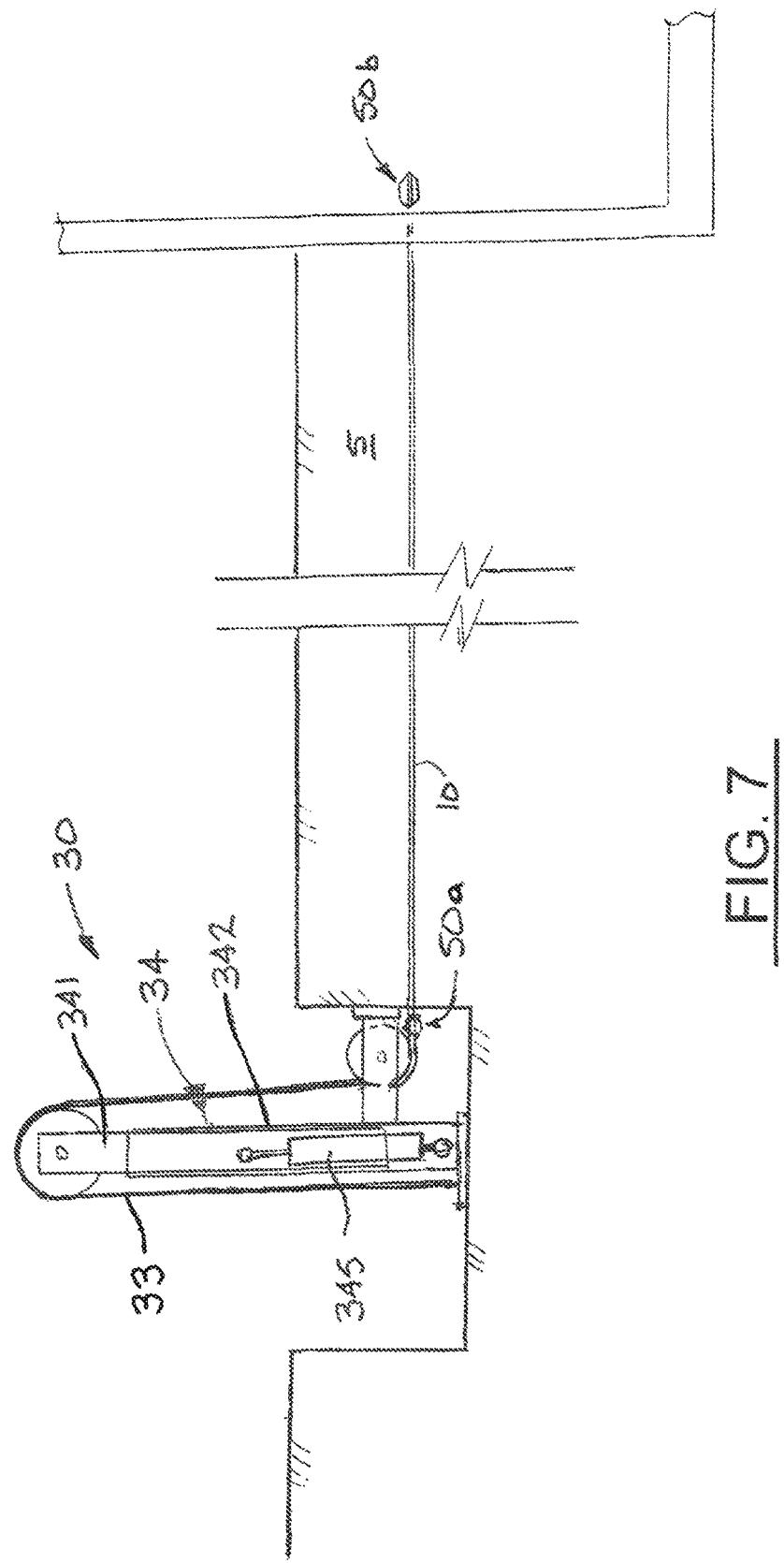
FIG. 7 illustrates an alternate means for managing cable and extracted pipe take-up during a removal operation.
Figure 8:
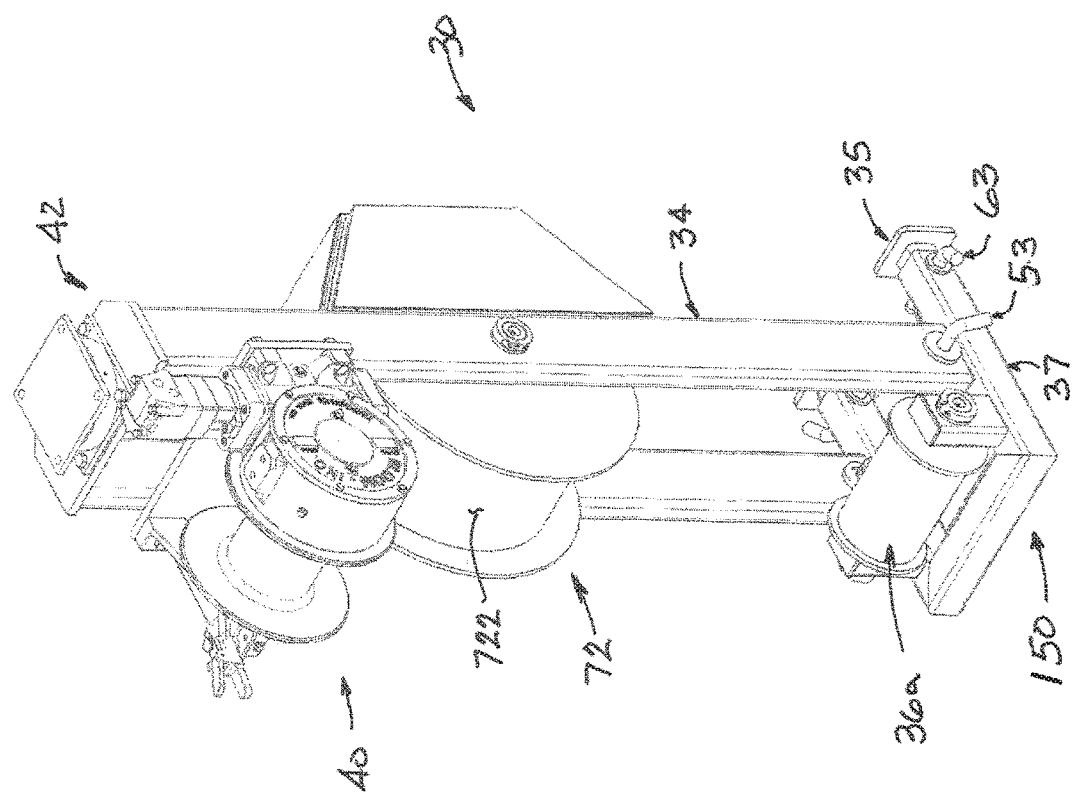
FIGS. 8 through 12 illustrate an alternate embodiment of a pipeline extraction apparatus embodying aspects of the present invention.
Figure 10:
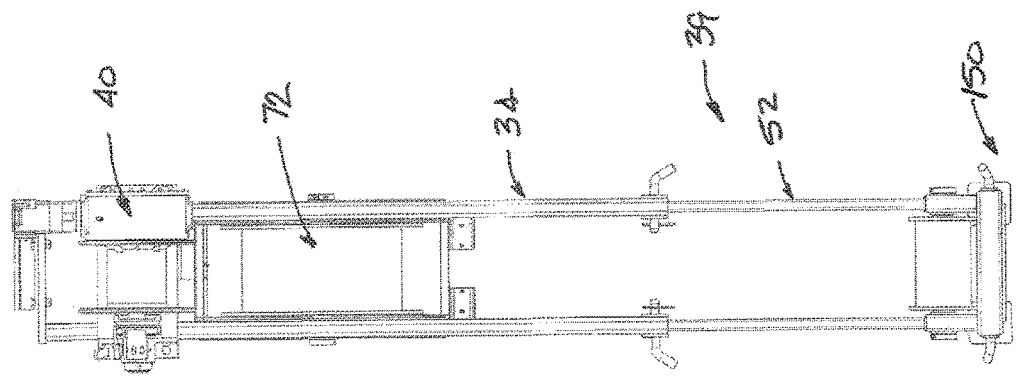
Figure 9:
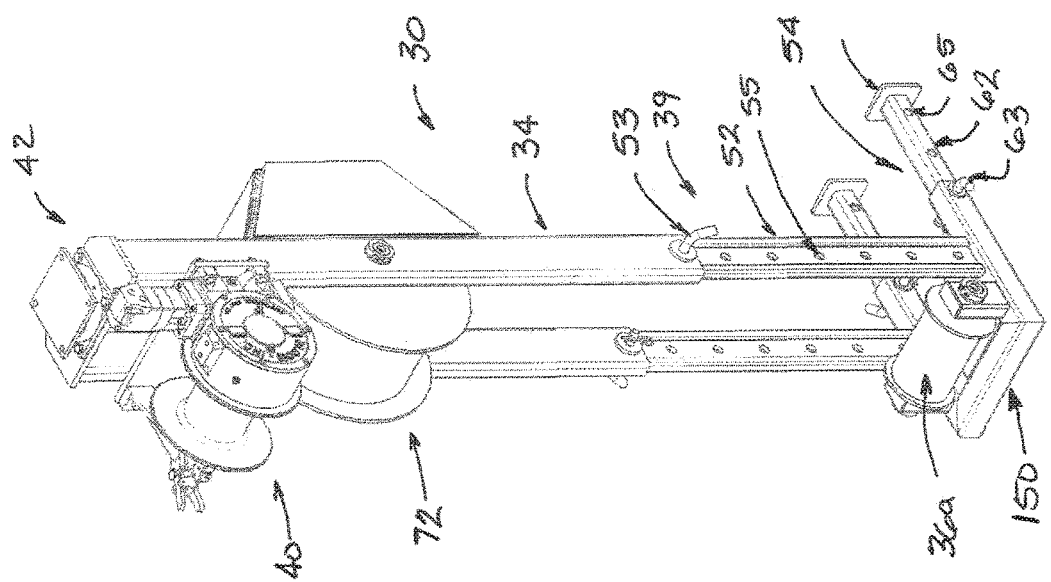
Figure 11:
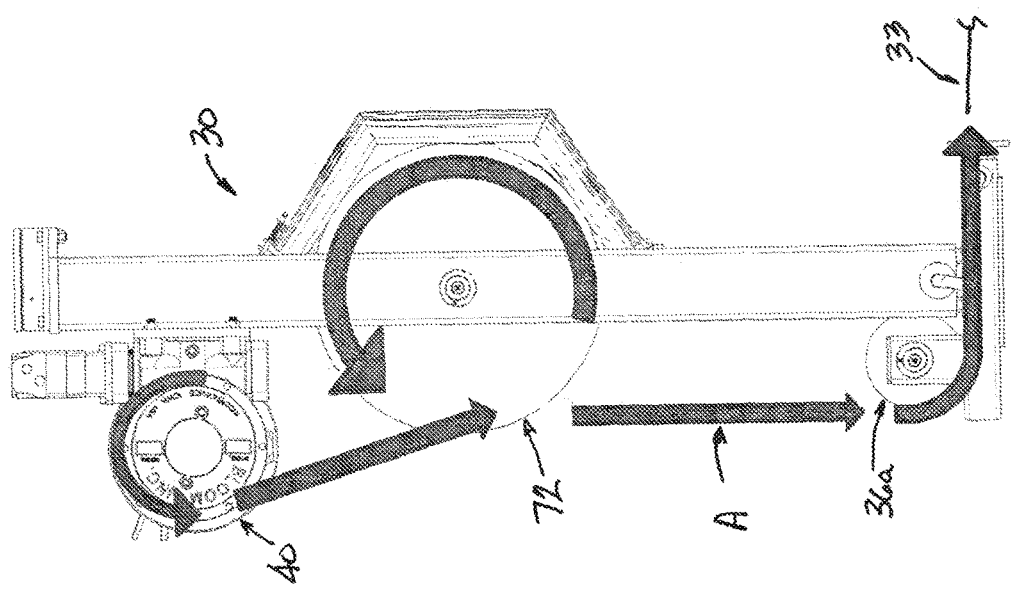
Figure 12:
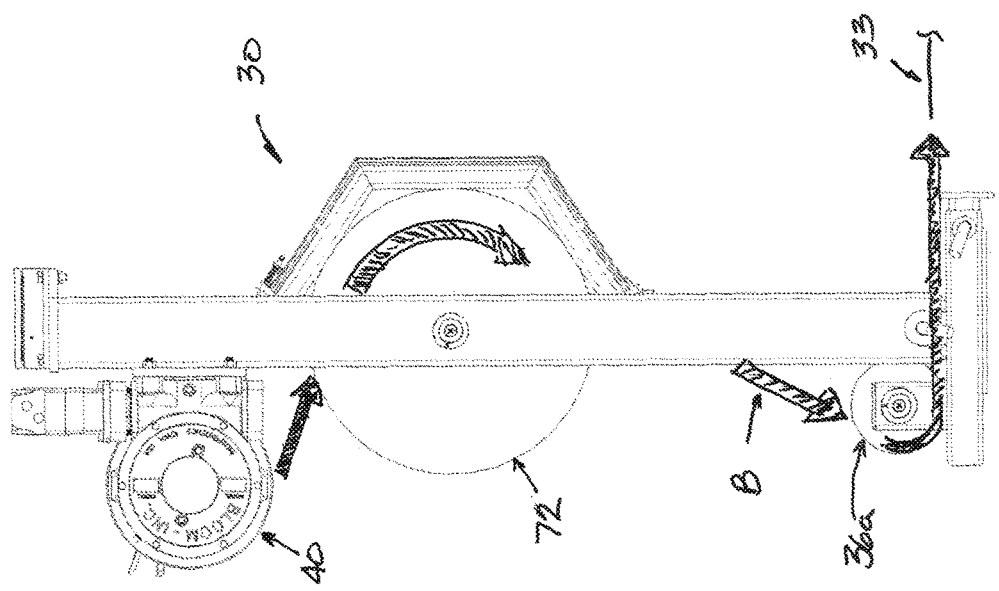

Other mast configurations are also possible. FIG. 7 illustrates one such alternative in which a pulling apparatus 40 is not available. The mast 34 may comprise telescoping sections 341, 342 with a hydraulic cylinder 345 or the like to selectively extend the telescoping sections. The second cable 33 is connected at one end to a fixed structure (shown as the base of the extraction apparatus in the figure). Tension is generated by extending the telescoping member. The cable connection may include provisions to adjust the cable anchorage and a take-up apparatus provided to increase the length of pipe than may be removed with the assembly. One disadvantage of this arrangement is a limited amount of extension and thus pipe line movement that may be achieved in a single stroke. The cable connection may include provisions to adjust the cable anchorage and a take-up apparatus provided to increase the length of pipe than may be removed with the assembly, though this configuration is inherently limited by the amount of extracted lead pipe that may be held on the apparatus and the need to remove extracted lead pipe therefrom. The advantage is a more compact footprint for the extraction apparatus which may work well when short service supply line lengths are involved.

The extraction apparatus 30 further comprises lateral and vertical reaction blocks 35, 37 to withstand the reaction forces of the second cable 33, which may be on the order of 4,000 to 10,000 lbf.

Once the pipe line 10 is extracted from the ground 5 and preferable supported on the extraction apparatus, the collets 50 and the interior (first) cable 32 are removed from the extracted pipe line 10. The pipe line 10 may then be contained and scrapped while the cable and collets are available for reuse. Once the first cable 32 is removed, the pipe line 10 may be cut by shearing into easily manageable length for disposal or recycling. The requirement to cut lead pipe by shearing instead of cutting or fracturing requires that any inserted material be removed prior to shearing. Otherwise such materials must be scrapped along with the extracted pipe line.

Removal of the extension line 15 between the main 19 and the service isolation valve 11 may be easily accomplished by realigning the extraction apparatus and directing the first cable 32 through the extension line 15. Most lead removal and replacement efforts involved excavation of the service main thereby facilitating assess to the distal end of the extension line adjacent to the tap 14.

In FIGS. 8 through 12, an alternative embodiment is illustrated for locations having limited overhead clearance preventing the mast 34 from being properly positioned. The extraction apparatus 30 comprises a mast 34 upwardly extending from a supporting base 150 for the apparatus. In this embodiment the extraction apparatus is preferably operably connected to a prime mover, such as a skid-steer-loader, eliminating the need for a vertical reaction block. The base 150 allows the apparatus 30 to support itself, either in a pipe line extraction pit or on a generally level surface when it is not in use. Lateral reaction blocks 35 are attached to the base 150. A first guide pulley 36a is rotatably connected to the mast 34 to guide the cables 32, 33 from the generally horizontal orientation of the pipe line 10 to an upward orientation for alignment with the extraction apparatus.

The pulling apparatus (winch) 40 may be attached to the mast 34 at an upper end 42 distally opposed from the first guide pulley 36a. The separation between the pulling apparatus 40 and the base 150 is minimized to limit extension of the mast above grade level. In the embodiment illustrated, the pulling apparatus 40 is powered by a hydraulic power take-off from the mobile skid-steer loader to which the extraction apparatus 30 is connected.

A take-up spool 72 mounted on the mast 34 intermediately between the pulling apparatus 40 and the first guide pulley 36a. The take-up spool forces the pulling cable to follow a non-linear path between the first guide pulley 35a and the pulling apparatus 40, best illustrated in FIGS. 11 and 12 as cable paths "A" and "B", in order to increase the length of pipe line 10 that may be positioned, once extracted from the ground, on the extraction apparatus 30. In use, the second cable 33 may encircle the periphery 722 of the take-up spool 72 one or more times before being directed to the pulling apparatus 40 (winch). As the first and second cables 32, 33 are pulled to withdraw the pipe line 10 from the ground, the first cable 32 and extracted pipe line 10 are wound around the take-up spool as the pulling apparatus removes the pipe line from the ground. With the length of the pipe line 10 known, the number of wraps of the cables around the periphery 722 necessary to contain the length of pipe line 10 being extracted may be determined. The cables must be directed around the take-up spool before attaching to the pipe line and beginning the extraction process. For this reason, the take-up spool 72 circumference and width are sized sufficiently large to provide ample space for extracted pipe line without requiring the pulling cables to overlap on the take-up spool circumference (e.g., the cable spirally wraps the spool in a single layer). Once the pipe line is fully extracted from the ground, the first cable 32 and the pipe line in which it is located may be unspooled from the take-up spool and the first cable 32 extracted from the pipe line 10. In this manner, the lead pipe line may be scrapped while the cable may be reused. In use, an estimate of the length of pipe line to be extracted allows an estimated number of wraps around the periphery 722 to be determined so that the pipe line, once removed, will be substantially contained on the take-up spool and not pulled into the pulling apparatus spool.

It is preferable for the height of the extraction apparatus to be less than eight feet so that it may be easily maneuvered and positioned in a pipe extraction access pit with minimal risk of interference with overhead utilities (e.g., electric or communication wires) proximate to the access pit. The extraction apparatus 30 is preferably supported adjacent the uppermost end of the mast 34. Vertical adjustment means 39 may be provided in the mast 34 to accommodate a range of excavated depths of pipe line removal trenches in which the pipe line extraction apparatus 30 may be used. The vertical adjustment means 39 enables the normal height of the extraction apparatus to be minimized while providing flexibility of use in locations having significant frost line depths or where pipes are buried deeply. Lateral adjustment means 54 may also be provided to position the reaction blocks 35 in adjacent contact with a reaction surface in the extraction pit. In the illustrated embodiment, both adjustments means are accomplished by telescoping members 52, 62 manually secured in position by a pin 53, 63 engaging one of a plurality of adjusting holes 55, 65. Alternative adjusting means include mechanical jacks and hydraulic actuators positioned to extend or retract respective telescoping members.

Guides may be provided adjacent to the winch 40 or guide pulley 36a to assure that the cables and/or pipe line 10 are not overlain on the take-up spool 72. Such guides may be connected to the base 150 or mast 34. Alternatively, winch 40 may be reoriented so that the cable pull favors one end of the take-up spool 72.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

I claim:

1. A method for removing a length of buried pipe from the ground comprising the steps of:
   providing a pipe extraction apparatus having a base frame, an upwardly extending mast, a first guide pulley connected to the base frame, a cable pulling apparatus connected to the mast, and a cable take-up spool connected to the mast and positioned between the cable pulling apparatus and the first guide pulley;
   providing a pull cable attachable to each end of the length of buried pipe to be extracted from the ground;
   positioning the pipe extraction apparatus adjacent to one of the ends of the buried pipe;
   inserting the pull cable through the buried pipe and directing into the pipe extraction apparatus so that the pull cable is directed along a non-linear path between the first guide pulley and the cable pulling apparatus;
   attaching the pull cable to each end of the buried pipe; and
   tensioning the pull cable by the cable pulling apparatus to remove the buried pipe from the ground and spool the buried pipe on the take-up spool.

2. The method of claim 1, further comprising the steps of:
   determining the length of the buried pipe to be removed; and
   wrapping a length of the pull cable around the take-up spool that is at least substantially equal to the length of buried pipe to be removed.

3. The method of claim 2, further comprising the steps of:
   providing a lateral reaction block connected to the base frame by a lateral adjusting mechanism;
   positioning the pipe extraction apparatus in an access pit having a floor and a side wall in which one of the ends of the buried pipe has been made accessible; and
   adjusting the lateral adjusting mechanism so that the pipe extraction apparatus base frame is adjacent to the floor and operably connected to a prime mover resting on the ground.

4. The method of claim 3, further comprising the steps of:
   unspooling the pull cable and pipe from the take-up spool after extraction of the pipe from the ground; and
   removing the pull cable from the pipe.

* * * * *